(12) United States Patent
Kimmitt et al.

(10) Patent No.: US 7,929,544 B2
(45) Date of Patent: Apr. 19, 2011

(54) METHOD AND APPARATUS FOR LINKING IDENTIFICATION DATA TO A CALL IN A NETWORK

(75) Inventors: Kelly G. Kimmitt, Bolingbrook, IL (US); Gerald W. Pfleging, Batavia, IL (US); George Paul Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 470 days.

(21) Appl. No.: 11/648,523

(22) Filed: Dec. 29, 2006

(65) Prior Publication Data
US 2008/0159308 A1 Jul. 3, 2008

(51) Int. Cl.
*H04L 12/28* (2006.01)

(52) U.S. Cl. .................................. 370/395.3; 370/401

(58) Field of Classification Search ............ 455/415
See application file for complete search history.

(56) References Cited

U.S. PATENT DOCUMENTS

| | | | | |
|---|---|---|---|---|
| 5,365,582 A * | 11/1994 | Yamada et al. | ......... | 379/266.07 |
| 5,848,140 A * | 12/1998 | Foladare et al. | ......... | 379/201.01 |
| 5,867,780 A * | 2/1999 | Malackowski et al. | ....... | 455/415 |
| 5,901,207 A * | 5/1999 | Pickeral | ................... | 379/127.01 |
| 6,097,800 A * | 8/2000 | McLellan | ................ | 379/114.15 |
| 6,101,382 A * | 8/2000 | Granberg | ................... | 455/414.1 |
| 6,449,474 B1 * | 9/2002 | Mukherjee et al. | ........ | 455/414.2 |
| 2002/0128036 A1 * | 9/2002 | Yach et al. | .................... | 455/552 |
| 2003/0007482 A1 * | 1/2003 | Khello et al. | ................ | 370/352 |
| 2003/0095542 A1 * | 5/2003 | Chang et al. | .................. | 370/352 |
| 2003/0142635 A1 * | 7/2003 | Roher et al. | .................. | 370/260 |
| 2003/0147518 A1 | 8/2003 | Albal et al. | | |
| 2005/0059394 A1 | 3/2005 | Easley | | |
| 2006/0040664 A1 * | 2/2006 | Murray et al. | ............. | 455/435.1 |
| 2006/0143692 A1 * | 6/2006 | Kodama et al. | ................... | 726/3 |
| 2006/0160566 A1 * | 7/2006 | Plahte et al. | ............... | 455/554.1 |
| 2008/0130554 A1 * | 6/2008 | Gisby et al. | ................... | 370/328 |

FOREIGN PATENT DOCUMENTS

| | | | |
|---|---|---|---|
| GB | 2 381 992 | | 5/2003 |
| GB | 2381992 | A * | 5/2003 |

OTHER PUBLICATIONS

Noldus, CAMEL, Intelligent Networks For the GSM, GPRS and UMTS Network, John Wiley & Sons, Ltd., 2006, front matter (2 pages), pp. 12-14, 79-83, 174, and 176.

* cited by examiner

*Primary Examiner* — Jayanti K Patel
*Assistant Examiner* — Hooman Houshmand
(74) *Attorney, Agent, or Firm* — Fay Sharpe

(57) ABSTRACT

A method and apparatus for linking caller identification data to a call that originates from a virtual private network is disclosed. Steps relating to the method receiving a call, including an identifier at a mobile switching center. The identifier would identify a termination point that initiated the call. The method also includes accessing a database with call identification information in response to a trigger and linking the call with caller identification data via the identifier. The method could also include that the call is received from a cellular VPN. The system implementing the method would include a database having stored within caller identification data corresponding to an identifier, a mobile switching center configured to receive the call from a VPN and an application server configured to access the database and link the call.

19 Claims, 4 Drawing Sheets

METHOD AND APPARATUS FOR LINKING IDENTIFICATION DATA TO A CALL IN A NETWORK

BACKGROUND OF THE INVENTION

This disclosure relates to a method and apparatus for linking identification data to a call in a network. More particularly, this disclosure relates to a method and apparatus for linking caller identification data to an enhanced virtual private network (eVPN) call.

While the disclosure is particularly directed to linking caller identification data to a call that originates in a cellular eVPN, and thus described with specific reference thereto, it will be appreciated that the disclosure may have usefulness in other fields and applications. For example, this disclosure may be used in other types of networks, including, but not limited to, virtual private networks, enhanced virtual private networks, cellular networks, Voice over Internet Protocol (VoIP) networks, etc. This disclosure may also be useful in other types of data transfer networks.

By way of background, consumers have become accustomed to the name/number of a calling party being displayed when an incoming call is registered through typical caller identification services. These services are standard package offerings from many telephone companies. Many telephones also have built-in caller identification display capabilities.

Many cellular phone VoIP networks have limited use of this service. One major reason for this is that name/number databases are not populated with sufficient information. Many times when a user is called from a cellular network or VPN, only the number is displayed with the name being empty. In the alternative, a name may be displayed if it is preprogrammed in the cellular handset memory. Otherwise, name and number pairs often are not available. Furthermore, when a call is forwarded from another system such as a public branch exchange (PBX) or when a call is routed over the internet, or international destinations, the number pair is not available. In these situations, called parties do not have the option to view the name and number of the calling party. This can be frustrating for users because often times they have paid for this service and are unable to take advantage of it. Furthermore, they have become accustomed to this service and feel uncomfortable answering the phone when they do not know who is calling.

In the case of international call handoffs from a PBX or VoIP network to the public network, calling party information is not necessarily carried through the network. In this situation, either a number from the local PBX is displayed or no display is present at all.

There is a need in the industry to access databases that contain the name/number pairings and link this information to calls that would otherwise not have this information. Furthermore, there is a need in the industry to allow this information to be linked through international network devices.

The present disclosure contemplates a new and improved that resolves the above-referenced difficulties and others.

SUMMARY OF THE INVENTION

The method and apparatus for linking caller identification data to a call that originates from a virtual private network are provided. This disclosure will allow for the display of caller identification data for calls in a virtual private network. In one aspect of the disclosure, the method includes receiving a call including an identifier to a mobile switching center (MSC). The identifier may be linked to a termination point that initiated the call. The method further includes accessing a database with caller identification data in response to a trigger and linking the call with the caller identification data via the identifier.

In accordance with another aspect of the present disclosure, the method includes that the call is received from a cellular virtual private network.

In accordance with another aspect of the present disclosure, the method includes the trigger being activated by all received calls.

In accordance with another aspect of the present disclosure, the method includes that the trigger is activated at least in part by the identifier.

In accordance with another aspect of the present disclosure, the method includes that the identifier be a user entered access code.

In accordance with another aspect of the present disclosure, the method includes that the identifier be user equipment electronic serial number.

In accordance with another aspect of the present disclosure, the method includes that the call is an international call.

In accordance with another aspect of the present disclosure, the method includes routing the call to a foreign network equipment. The foreign network equipment is configured to exempt the call identification information linked with the international call.

In accordance with another aspect of the present disclosure, the method includes accessing a database including accessing a database internal to the virtual private network.

In accordance with another aspect of the present disclosure, the system includes a database having stored within the caller identification information corresponding to an identifier, a mobile switching center configured to receive the call originating from a virtual private network, recognize the identifier and communicate with an application server in response to a trigger. The system also includes an application server configured to access the database and link the call to the caller identification information.

In accordance with another aspect of the present disclosure, the system includes the identifier being the originating phone number.

In accordance with another aspect of the present disclosure, the system includes the trigger being activated via a user entered access code.

In accordance with another aspect of the present disclosure, the system includes the trigger being activated via receiving an incoming call.

In accordance with another aspect of the present disclosure, the system includes the virtual private network being a cellular virtual private network.

In accordance with yet another aspect of the present disclosure, the system includes the call being an international call and a switch located in the called party's country configured to receive the international call linked with the caller identification data.

In accordance with yet another aspect of the present disclosure, the system includes a database having stored within caller identification data corresponding to an identifier. A linking module configured to link a call that originated from a virtual private network to the caller data information and a switching module configured to receive the call originating from the virtual private network and communicate with the linking module in response to a trigger.

In accordance with another aspect of the present disclosure, the system includes a routing module configured to route the call in response to a trigger.

In accordance with another aspect of the present disclosure, the system includes a database that is internal to the virtual private network.

In accordance with yet another aspect of the present disclosure, the system includes the virtual private network being a cellular virtual private network.

DESCRIPTION OF THE DRAWINGS

The presently described embodiments exist in the construction, arrangement, and combination of the various parts of the device, and steps of the method, whereby the objects contemplated are attained as hereinafter more fully set forth, specifically pointing out the claims, and illustrated in the accompanying drawings in which:

DETAILED DESCRIPTION

Figure 1:
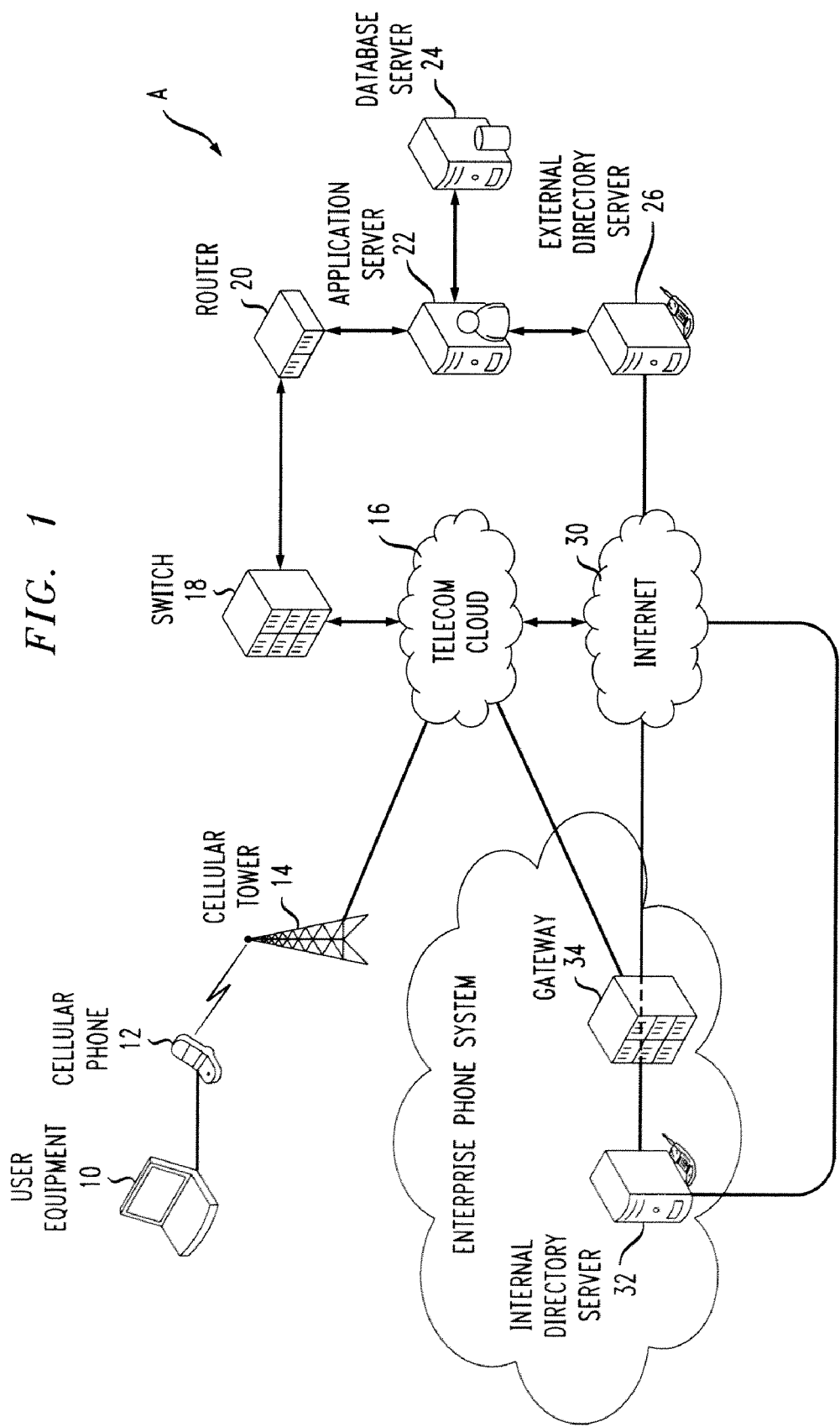
FIG. 1 illustrates a portion of the overall communications network.

Referring now to the drawings wherein the showings are for purposes of illustrating the disclosed embodiments of the disclosure only and not for purposes of limiting the same, FIG. 1 provides an overall view of a system into which the present disclosure may be incorporated. The communications infrastructure A is shown. The communications infrastructure includes user equipment 10, 12; communications tower 14; telecommunications network 16; a switch 18; a router 20; an application server 22; a database server 24; a directory server that is external to the enterprise phone system 26; the internet 30; a directory server internal to the enterprise phone system 32; and the gateway internal to the enterprise phone system 34. It should be understood that this represents but one embodiment of the communication network's infrastructure A. The present disclosure could be incorporated in a variety of communication network configurations.

In operation, as discussed in greater detail below, the presently described embodiments include a method of linking identification data to a call that originates in a virtual private network. The present disclosure allows for caller identification data to be linked to calls that otherwise would not display them. These calls generally would be originating from a VPN. Often times a call going through a VPN such as a private branch exchange (PBX) would only display call identification data of the PBX. For example, an outgoing call from Company A's enterprise phone system may state the company's main phone number instead of the actual phone number of the person calling. Furthermore, in the name information block, Company A would be displayed instead of Employee A. The system and method disclosed allows for this data to be filled with more precise information.

Still referring to FIG. 1, the user equipment 10, 12 could be associated with a variety of different communication devices including, but not limited to, wireless phone, VoIP telephone, a laptop computer, a desktop computer a Wi-Fi phone, etc. These end devices are typically consumer premise equipment used to communicate through compatible lines. Generally, the user equipment 12 will be a cellular phone connecting to a cellular tower 14.

The cellular tower 14 would be in communication with a telecommunications network 16. The telecommunications network 16 would also be in communication with a switch 18. The switch would be in communication with a router 20 and an application server 22. The application server 22 would also have access to a database server 24 and a directory server 26.

The internet 30 could also be used as a network for communication. The enterprise phone system could also be in communication with both the internet 30 and the telecommunications network 16. The enterprise phone system may consist of the enterprise's directory server 32 and gateway 34, among other network elements.

Still referring to FIG. 1, a call would generally originate through user equipment 10, 12. User equipment is illustrated by a cellular phone 12 which would be a common end device for a cellular virtual private network. These networks would communicate with cellular towers 14 in order to access the network.

The call is received at the switch 18. When the switch receives the call, the call may set off a trigger. A trigger could be activated through a variety of methods. In one embodiment, the trigger is activated by receiving a cellular call from the VPN. In another embodiment, the trigger is activated through the call's identifier. In another embodiment, the trigger is activated through user entered access codes. In yet another embodiment, the trigger is activated by the destination of the call, i.e., an international call, a call outside of the network, etc.

The call may have with it an identifier. An identifier could be characterized by a variety of attributes. The identifier could include the electronic serial number of the end device. The identifier could also be a user access code entered when the call was made. An identifier could also be which end device is making the call, i.e. a computer or Wi-Fi phone. The identifier is used to match the call with the caller identification data. This is explained in greater detail below.

When the call is received by the switch, a trigger is initiated. The switch 18 will route the call to the application server 22. The application server 22 may exercise a variety of options concerning the call, depending on the network configuration and the trigger. For example, the application server 22 may take over the call if it is an international call (explained in more detail in FIG. 2). The application server 22 could also reject the call if it is outside of its network parameters. The application server 22 could also allow the call to proceed by simply sending the call back to the MSC 18. In one embodiment, the application server 22 accesses the database 24 in order to link the call with caller identification data and then returns the call to the MSC 18 to be completed.

The database server 18 may be populated by a variety of methods. In one embodiment, the external directory server 26 has the information in order to populate the database server 24. In another embodiment, the directory server 26 is internal to the corporate system. In this form, all of the corporate phone numbers would be stored in the directory server 32 and accessed by the database server 24 wherein the application server 22 could query the database server 24 and/or the directory server 26, 32 in order to link the call identification data to the call.

This method may be especially useful in a VoIP system. The VoIP gateway 34 which is typically internal to the enterprise phone system, may be available via internet and accessible through the application server 22. In any form, the database server 24 would have the information necessary to link the incoming call through its identifier to the caller identification data.

The caller information data could also be a variety of messages. In one form, the caller information data is the name and number of the person calling. In another form, it is a greeting. The network administrators may reference the database according to whatever identifier they deem necessary. The caller information data may also be any message they want displayed.

Figure 2:
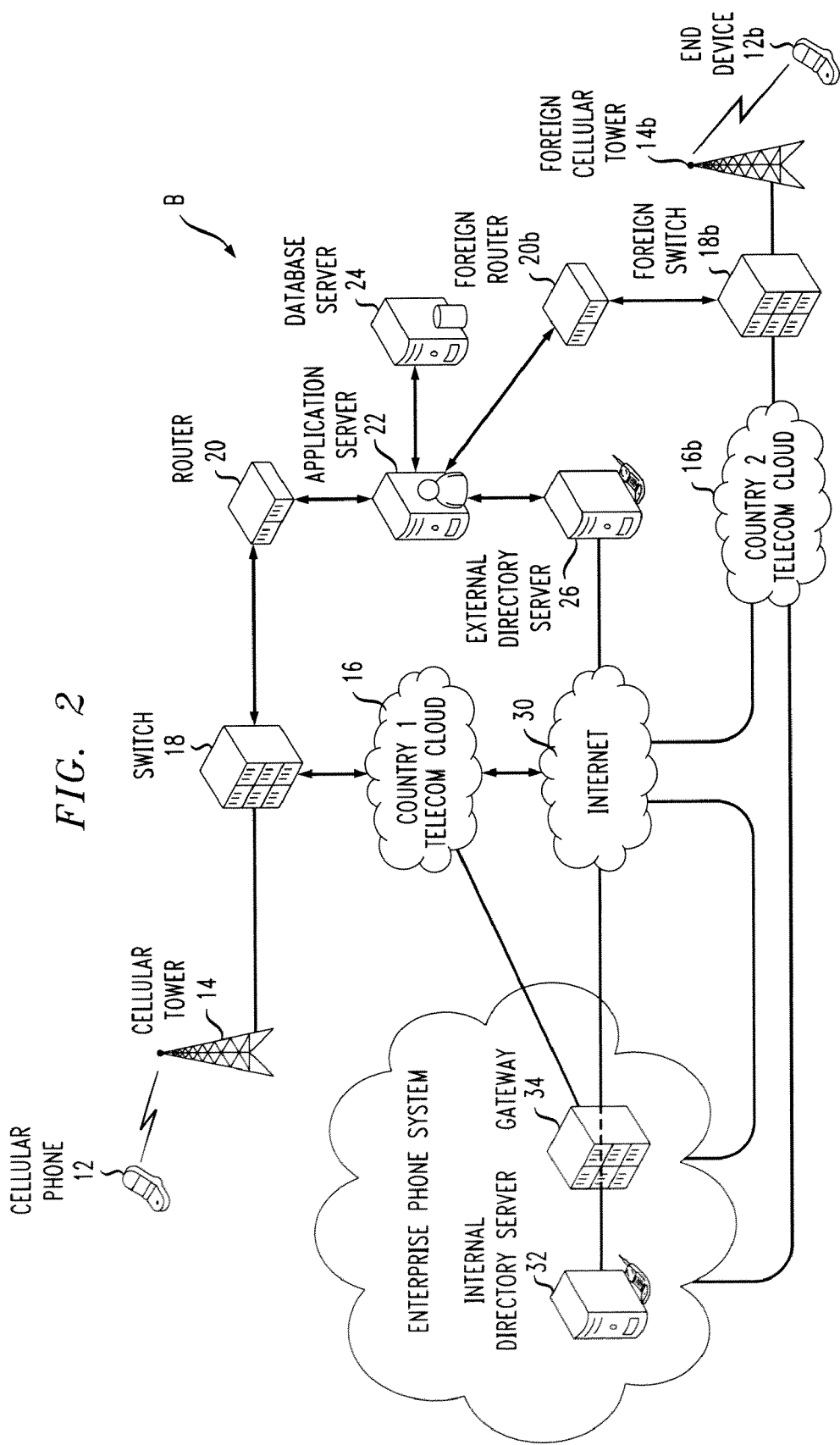
FIG. 2 illustrates a portion of the international communications network.

Now referring to FIG. 2 which is a system for international calling. This system which is similar to the overall system A, also has a foreign MSC 18B and a foreign telecom network 16B. This system B also has a foreign router 20B. In this system a call is originating from end device 12 to end device 12B which is in a different country. In this system, the trigger would be activated which allows for the MSC 18 to route the call to the application server 22. The application server 22 would recognize that this is an international call when linking the caller identification data. In one embodiment, the application server 22 would take over the call, route the call to the foreign MSC 18B and complete the call to the foreign cellular end device 18B. In the prior art under this circumstance, the caller identification data would reflect a local call because in reference to the receiving user equipment 12B, the call would appear to be originated from the local PBX. However, if the caller identification data is linked when the call is routed through the application server 22, the caller identification data display would show whatever the application server 22 had linked to the call. In essence the system would be overridden so that the local PBX would not be displayed in the caller identification display of the end device 12B.

Again, the caller identification data may be in many forms. For example, the caller information data could be the name of the person whom the cell phone is registered to and the number of the user equipment 12. The caller information data could be a message such as, "Greetings from America". The system will be capable of displaying a variety of different messages dependent upon what the database 24 has linked to the call identifier.

Figure 3:
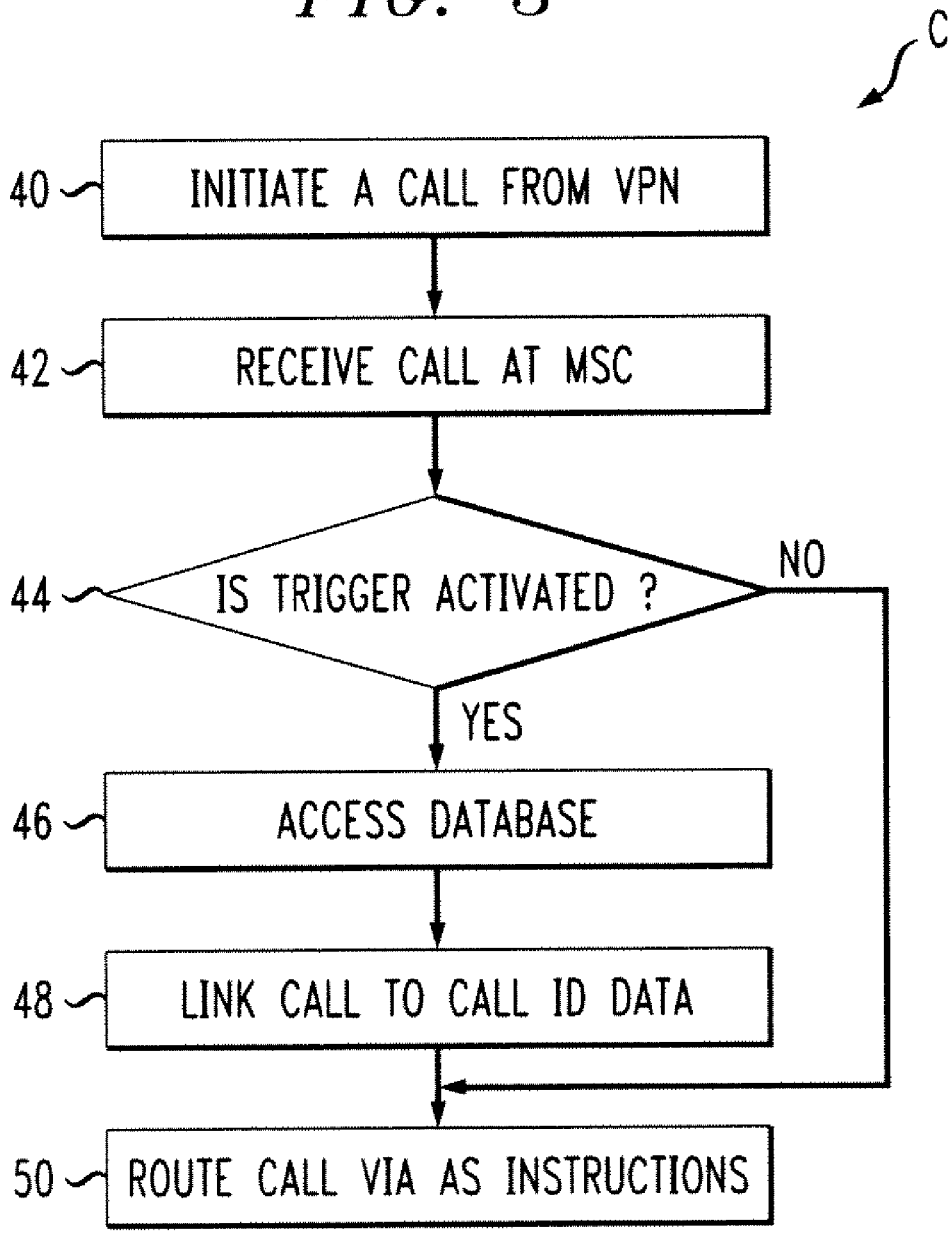
FIG. 3 is a flow chart illustrating the method of the present disclosure.

Now referring to FIG. 3 which is a method for linking caller identification data to a call that originates from a virtual private network. It should be understood that the method may be implemented by a variety of software and hardware configurations. In one embodiment, the software implementing the method resides on the application server 22, which may be a MiLife® application server. In another embodiment, the software implementing method C is on an enhanced service manager (eSM) (not shown). In another embodiment, the software implementing method B resides on the enterprise phone system. It should be understood that suitable software/hardware implementing the embodiments of the invention may also be distributed on any/all appropriate network elements.

Method C includes initiating a call from the VPN (at step 40). The call may be initiated through any one of the many available end devices. These end devices include cellular phones, Wi-Fi phones, desktop computers, laptop computers, etc. The call from initiation will be from the VPN to any number of possible destinations, including another VPN end device.

The method continues with receiving a call at the MSC, (at step 42). The MSC 18 has a trigger which could be activated by a variety of methods. In one embodiment, the trigger is activated by the destination being called. In another embodiment, the trigger is activated by the user equipment initiating the call. In yet another embodiment, the trigger is activated simply by the MSC receiving a call from the VPN.

The next step is evaluating whether the trigger is activated (at step 44). If the trigger is activated, a variety of steps may be implemented as explained in greater detail below. If the trigger is not activated, the call will be routed via the application server instructions. The MSC 18, when it receives a call, communicates with the application server 22. The application server 22 in turn dictates what to do with the call, while the MSC waits for a reply. It should be noted, if the MSC 18 times out while waiting for a reply, the MSC 18 may proceed as normal, drop the call, or send another request, depending on the default operation for the MSC 18.

The method continues with accessing the database (at step 46) if the trigger was activated. The database 24 is populated with caller identification data to be linked to calls, depending on the calls identifier. The database 24 may be populated with numbers, identifiers, and/or messages from internal directory servers 32 and/or external directory servers 26. The database may also have a default message in case the identifier is not recognized.

The method C continues with linking the call to caller identification data (at step 48). The step of linking the call to caller identification data connects the call to whatever message the call should show on caller ID display when it goes through the system. Generally, this caller identification data will override any other caller identification data information that was previously stored and/or linked with the call. Furthermore, once the caller identification data is linked to the call, it cannot be overridden by other default commands as it travels through the communication network. For example, if the call is rerouted to another gateway, MSC and or PBX, the caller information data would not be replaced. In this sense, a display at the called party's end device would still display the linked caller identification data, regardless of where the call was routed.

The method concludes with routing the call via the application server's instructions (at step 50). The application server may have dictated that the call be routed to another country, for example. In which case, the call would still be routed and the caller identification data would still be linked to that call.

Figure 4:
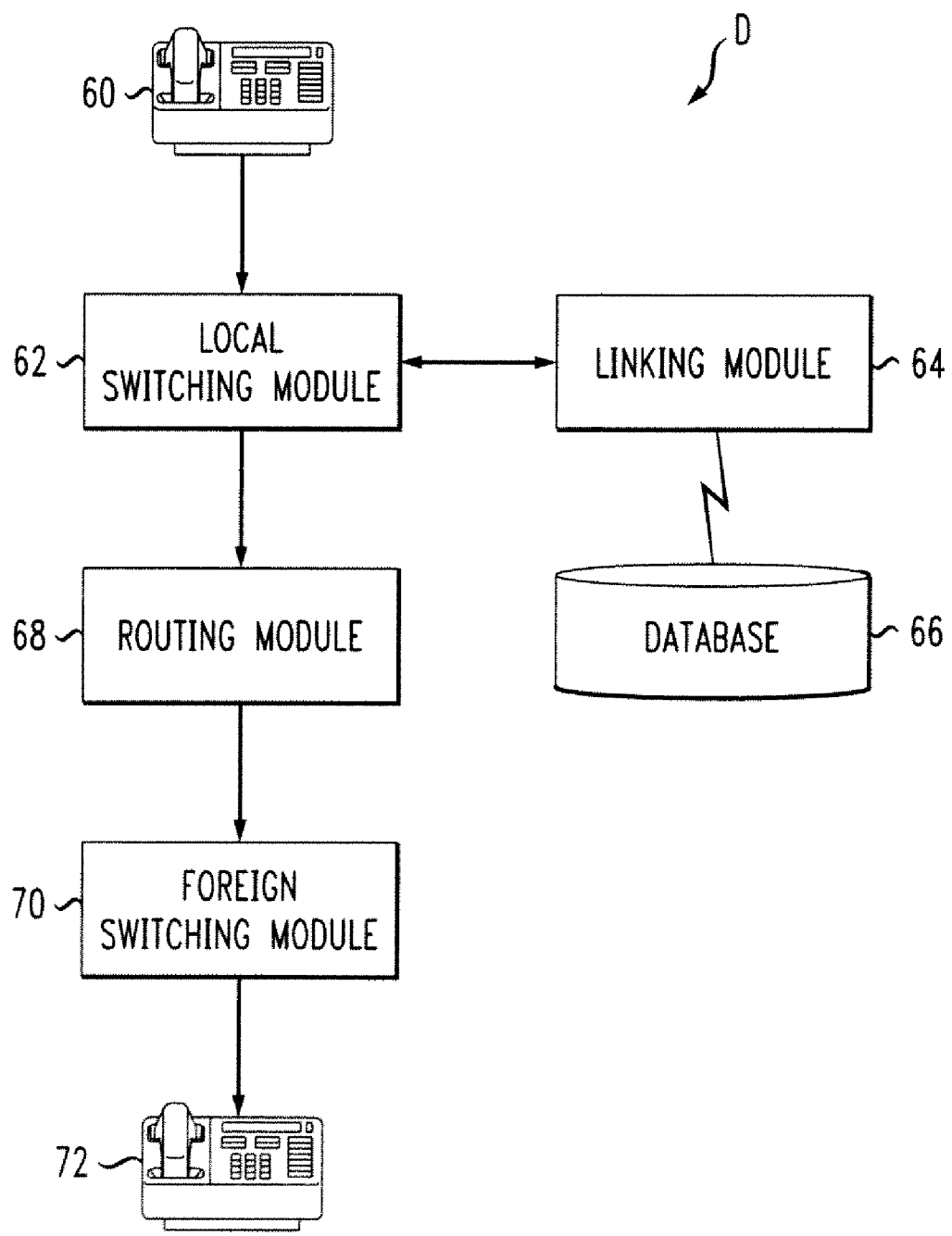
FIG. 4 illustrates a functional diagram of the system of the present disclosure.

Now referring to FIG. 4 which is a functional diagram of the system of linking caller identification data to a call. This system may be implemented in the system described in FIG. 1 or FIG. 2. It should also be appreciated this system may be implemented in a variety of other communication networks. It should also be noted that the software implementing this system may reside on one or a variety of network elements. This system includes originating user equipment 60 which initiates the call. A local switching module 62, a linking module 64, a database 66, a routing module 68, a foreign switching module 70, and an end device associated with the called party 72.

As the call originates from the end device 60, the call goes to the local switching module 62. The local switching module possesses within it a trigger. If the trigger is activated, the call will then be communicated to a linking module 64.

The linking module is in communication with a database 66. The linking module may then query the database in order to link the call to caller identification information.

The database 66 may be populated by a variety of methods known in the art. In one embodiment, the database 66 is populated through enterprise phone directory 32. In another embodiment the database 66 is populated through a public directory 26. In any form, the database 66 is populated to include caller identification data which is matched with a call identifier.

The caller identification data may include a variety of messages. The messages include, but are not limited to, the calling party's end user equipment telephone number, a greeting, a name, a city/state, etc. The caller identification data could include a title, along with the name, such as "Company A manager", or any other message that the system administrator chooses to use to populate the database.

The linking module will then return the call to the local switching module 62 which will in turn incorporate the routing module 68 to route the call to its proper destination.

In one embodiment, the proper destination is a foreign destination 72, in which case it may have received instructions to route the call to a foreign switching module 70. As such is the case, the linked call would still be linked even if the call would go through a foreign PBX. Thereby, even if the PBX was dialing and forwarding a call to the called party's end device 72, the number of that local PBX would not be displayed. Instead, the caller information data, which was linked to the call would be displayed on the end user's display device.

The above description merely provides a disclosure of particular embodiments of the invention and is not intended for the purposes of limiting the same thereto. As such, the disclosure is not limited to only the above-described embodiments. Rather, it is recognized that one skilled in the art could conceive alternative embodiments that fall within the scope of this disclosure.

We claim:

1. A method of linking of caller identification data to a call, comprising:
   receiving a call from a calling party to a called party at a mobile switching center, the call originating from a virtual private network (VPN) and including a user entered access code associated with the calling party;
   setting off a predetermined trigger in response to receiving the call, the predetermined trigger being activated through the user entered access code;
   routing the call to an application server in response to the predetermined trigger;
   accessing a database populated with a plurality of caller identification data in response to the predetermined trigger;
   selecting a specific caller identification data associated with the calling party from the database based at least in part on the user entered access code;
   linking the specific caller identification data to the call via the user entered access code; and
   routing the call with the specific caller identification data to the called party;
   wherein the specific caller identification data overrides any other caller identification information that was previously stored and/or linked to the call.

2. The method according to claim 1, wherein said call is received from at least one of a cellular network, a private branch exchange (PBX), an enterprise phone system, an internet, and a voice over internet protocol (VoIP) network.

3. The method according to claim 1, wherein receiving a call includes the user entered access code being an electronic serial number associated with the calling party.

4. The method according to claim 1, wherein receiving a call includes said call being an international call.

5. The method according to claim 4, further comprising routing the call to foreign network equipment, said foreign network equipment being configured to accept said caller identification data linked with said international call.

6. The method according to claim 1 wherein accessing the database includes accessing at least one of a database server, a directory server, an external directory server, an internal directory server, a phone directory, a public phone directory, and an enterprise phone directory.

7. The method according to claim 1 wherein the selected caller identification data includes at least one of the actual telephone number, a name/number pair, a title, a greeting, a message, a city, and a state.

8. A system for linking caller identification data to a call, comprising:
   a database having stored within a plurality of caller identification data;
   a mobile switching center configured to receive a call from a calling party to a called party, the call originating from a virtual private network (VPN) and including a user entered access code associated with the calling party, the mobile switching center also configured to set off a predetermined trigger in response to receiving the call, the predetermined trigger being activated through the user entered access code, and the mobile switching center configured to communicate with an application server in response to the predetermined trigger; and
   said application server configured to access said database, select a specific caller identification data associated with the calling party based at least in part on the user entered access code, and link the specific caller identification data to the call, wherein the specific caller identification data overrides any other caller identification information that was previously stored and/or linked to the call.

9. The system according to claim 8, wherein the user entered access code includes an electronic serial number associated with the calling party.

10. The system according to claim 8, wherein said virtual private network includes at least one of a cellular network, a private branch exchange (PBX), an enterprise phone system, an internet, and a voice over internet protocol (VoIP) network.

11. The system according to claim 8 wherein the call is an international call, the system further comprising:
    a switch located in the called party's country configured to receive said international call linked with said caller identification data.

12. The system according to claim 8, accessing the database comprising accessing at least one of a database server, a directory server, an external directory server, an internal directory server, a phone directory, a public phone directory, and an enterprise phone directory.

13. The system according to claim 8 wherein the selected caller identification data includes at least one of the actual telephone number, a name/number pair, a title, a greeting, a message, a city, and a state.

14. A system for linking caller identification information to a call, the system comprising:
    a database having stored within a plurality of caller identification data;
    a linking module configured to access the database and select a specific caller identification data associated with a calling party based at least in part on a user entered access code associated with the calling party in a call to a called party that originated from a virtual private network; and
    a switching module configured to receive the call with the user entered access code and set off a predetermined trigger in response to receiving the call, the predetermined trigger being activated through the user entered access code, the switching module also configured to communicate with said linking module in response to the predetermined trigger.

15. The system according to claim 14, further comprising, a routing module configured to route said call with the specific caller identification data to the called party.

16. The system according to claim 14, wherein said virtual private network includes at least one of a cellular network, a private branch exchange (PBX), an enterprise phone system, an internet, and a voice over internet protocol (VoIP) network.

17. The system according to claim 14 wherein the user entered access code includes an electronic serial number associated with the calling party.

18. The system according to claim 14, accessing the database comprising accessing at least one of a database server, a directory server, an external directory server, an internal directory server, a phone directory, a public phone directory, and an enterprise phone directory.

19. The system according to claim 14 wherein the selected caller identification data includes at least one of the actual telephone number, a name/number pair, a title, a greeting, a message, a city, and a state.

\* \* \* \* \*